United States Patent
Falconer et al.

(10) Patent No.: US 10,810,621 B2
(45) Date of Patent: Oct. 20, 2020

(54) VEHICLE ADVERTISEMENT

(71) Applicant: Ford Global Technologies, LLC, Dearborn, MI (US)

(72) Inventors: William Falconer, Detroit, MI (US); Zachary Konchan, Berkley, MI (US); James Hartman Teasley, Dearborn, MI (US); George T. Dickinson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 16/132,848

(22) Filed: Sep. 17, 2018

(65) Prior Publication Data

US 2020/0090224 A1    Mar. 19, 2020

(51) Int. Cl.
| | |
|---|---|
| *G06Q 30/02* | (2012.01) |
| *G06K 7/14* | (2006.01) |
| *G06K 9/00* | (2006.01) |
| *G02B 27/01* | (2006.01) |
| *G06F 3/01* | (2006.01) |
| *B60K 35/00* | (2006.01) |

(52) U.S. Cl.
CPC ......... *G06Q 30/0265* (2013.01); *B60K 35/00* (2013.01); *G02B 27/0179* (2013.01); *G06F 3/013* (2013.01); *G06K 7/1404* (2013.01); *G06K 9/00791* (2013.01); *B60K 2370/334* (2019.05); *G02B 2027/0187* (2013.01)

(58) Field of Classification Search
CPC .............. G06T 19/006; G06K 9/00671; G02B 2027/014; G02B 2027/0141; B60K 2370/152; B60K 2370/1529; B60K 2370/16; B60K 2370/177; G06Q 30/0241; G06Q 30/0265; G06Q 30/0266
See application file for complete search history.

(56) References Cited

U.S. PATENT DOCUMENTS

| | | | |
|---|---|---|---|
| 9,135,754 B2 | 9/2015 | Ng-Thow-Hing | |
| 9,607,515 B2 | 3/2017 | Rider et al. | |
| 10,354,291 B1* | 7/2019 | Teller | G06Q 30/0276 |
| 2001/0055165 A1* | 12/2001 | McCarthy | G06Q 20/327 |
| | | | 359/839 |
| 2005/0154638 A1* | 7/2005 | Altaf | G06Q 30/0251 |
| | | | 705/14.49 |
| 2013/0246181 A1 | 9/2013 | Lobsenz | |
| 2014/0344062 A1* | 11/2014 | Lamont | H04W 4/80 |
| | | | 705/14.64 |

(Continued)

FOREIGN PATENT DOCUMENTS

WO    2015077766 A1    5/2015

OTHER PUBLICATIONS

Webb, Alex, Automotive News webpage, Smart Windshields Seen as the New Ad Billboard Inside a Car, Jan. 6, 2017, 2 pages.

*Primary Examiner* — Jeffery A Brier
(74) *Attorney, Agent, or Firm* — Michael Spenner; Brooks Kushman PC

(57) ABSTRACT

A vehicle includes a controller programmed to, responsive to detecting a barcode displayed outside the vehicle via an exterior sensor, decode the barcode, and project an image representing an information decoded from the barcode on a windshield of the vehicle, the image overlaying the barcode from a perspective of a user.

19 Claims, 6 Drawing Sheets

(56) References Cited

U.S. PATENT DOCUMENTS

| | | |
|---|---|---|
| 2017/0116785 A1 | 4/2017 | Jarvis et al. |
| 2017/0174129 A1* | 6/2017 | Chin .................... G08G 1/166 |
| 2018/0260638 A1* | 9/2018 | Michalakis ............ H04N 7/188 |
| 2019/0043088 A1* | 2/2019 | Garcia ............... H04N 5/23296 |
| 2020/0073520 A1* | 3/2020 | Mohan ............... G06Q 30/0235 |

* cited by examiner

VEHICLE ADVERTISEMENT

TECHNICAL FIELD

The present disclosure is generally related to a system for presenting a message to a vehicle user. More specifically, the present disclosure is related to a system for projecting a visual advertising image onto a windshield.

BACKGROUND

Advertising to vehicle users is an increasingly profitable and competitive business market. Traditionally, advertisers put billboards and signs near roads and intersections to attract customers. With technological advancements, digital advertisements may be more effective and tailored to customers and their specific interests.

SUMMARY

In one or more illustrative embodiment of the present disclosure, a vehicle includes a controller programmed to, responsive to detecting a barcode displayed outside the vehicle via an exterior sensor, decode the barcode, and project an image representing an information decoded from the barcode on a windshield of the vehicle, the image overlaying the barcode from a perspective of a user.

In one or more illustrative embodiment of the present disclosure, a vehicle includes a controller programmed to, responsive to detecting a wireless signal transmitted from a transponder via an exterior sensor, process the wireless signal to obtain a message containing a weblink, download an image via the weblink, and project the image on a surface of the vehicle.

In one or more illustrative embodiment of the present disclosure, a method for a vehicle includes responsive to detecting a barcode displayed outside the vehicle by a camera, decoding the barcode to obtain an advertising information by a processor; downloading a digital file using a weblink contained in the advertising information from a server by the processor; and outputting an advertising message to a vehicle user using the digital file by an output.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for advertising to vehicle users. More specifically, the present disclosure proposes a system for detecting advertising barcodes, and presenting to vehicle users an advertisement decoded from the barcode.

Figure 1:
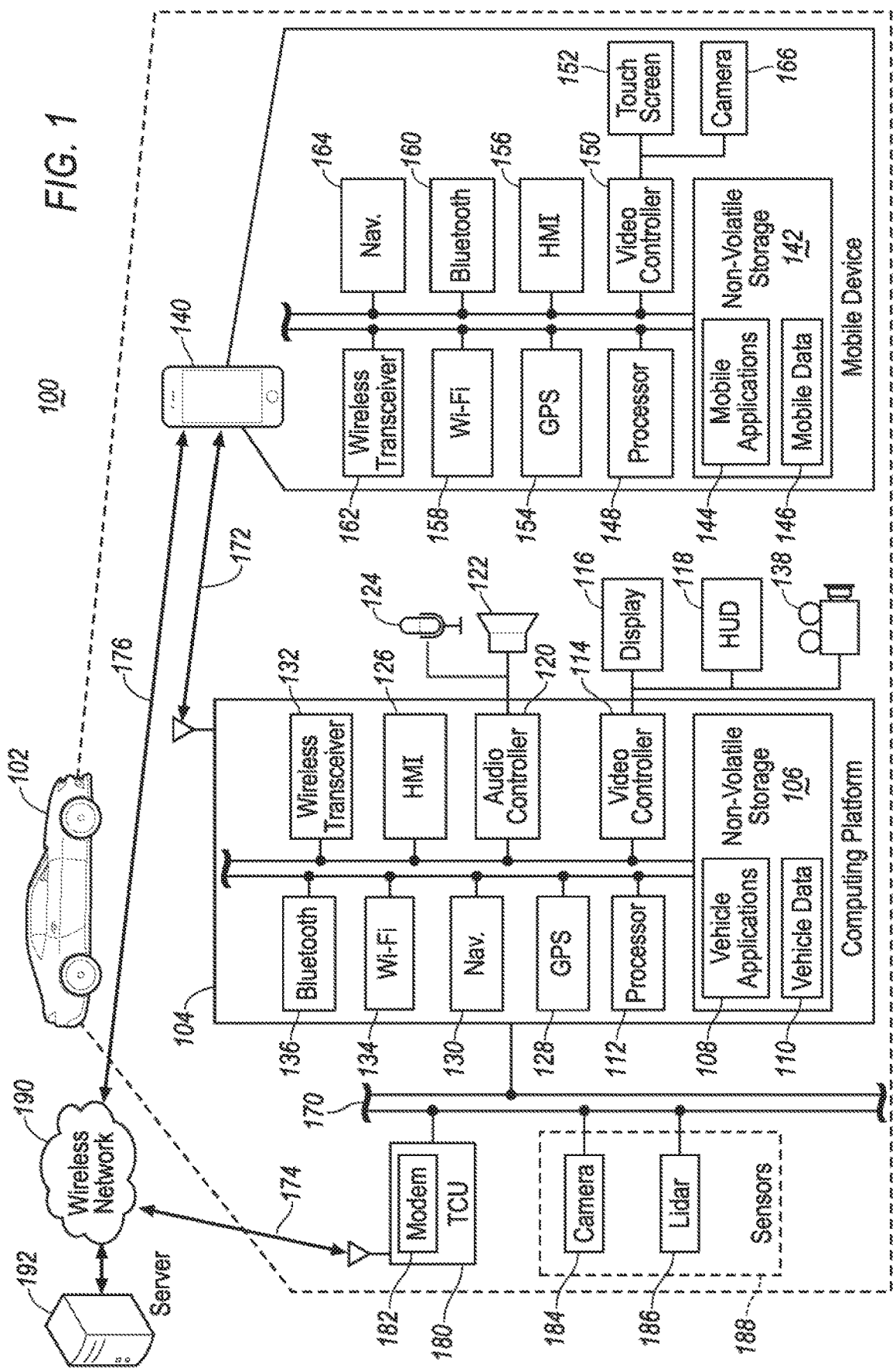
FIG. 1 illustrates an example block topology of a vehicle system of one embodiment of the present disclosure.

Referring to FIG. 1, an example block topology of a vehicle system 100 of one embodiment of the present disclosure is illustrated. Vehicle 102 may include various types of automobile, crossover utility vehicle (CUV), sport utility vehicle (SUV), truck, recreational vehicle (RV), boat, plane, or other mobile machine for transporting people or goods. The vehicle 102 may be provided with autonomous driving features operated by a computer with or without human intervention. In many cases, the vehicle 102 may be powered by an internal combustion engine. As another possibility, the vehicle 102 may be a battery electric vehicle (BEV) power by one or more electric motors, a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. The vehicle 102 may include a telematics system or a computing platform 104, such as the SYNC system manufactured by The Ford Motor Company of Dearborn, Mich. It should be noted that the illustrated system 100 is merely an example, and more, fewer, and/or differently located elements may be used.

As illustrated in FIG. 1, the computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and image processing. Such instructions and other data may be maintained in a nonvolatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input by way of a human-machine interface (HMI) controls 126 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be provided with touch screen capabilities while in other cases the display 116 may be a display only, without touch input capabilities. The computing platform 104 may further drive a head up display (HUD) 118 configured to provide further visual output to vehicle occupants by way of the video controller 114. The HUD 118 may be provided with projection capabilities to project an image onto a surface, such as the windshield of the vehicle 102, to provide more direct visual experience to vehicle occupants. The computing platform 104 may further drive an interior camera 138 configured to provide video input by way of the video controller 114. The interior camera 138 may be configured to capture images within a cabin of the vehicle 102. The computing platform 104 may also drive or otherwise communicate with one or more speakers 122 and microphone 124 configured to provide audio output and audio input from vehicle occupants by way of an audio controller 120.

The computing platform 104 may also be provided with navigation and route planning functions through a navigation controller 130 configured to plan navigation routes responsive to user input via e.g. the HMI controls 126, and output planned routes and instructions via the speaker 122, the display 116 or the HUD 118. Location data that is needed for navigation may be collected from a global positioning system (GPS) controller 128 configured to communicate with multiple GPS satellites and calculate the location of the vehicle 102. Navigation software may be stored in the storage 106 as a part of the vehicle applications 108. Map data used for route planning may be stored in the storage 106 as a part of the vehicle data 110. For instance, the map data may include condition of a particular street, such as the length and width of an alleyway.

The computing platform 104 may be further configured to communicate with various other components of the vehicle 102 via one or more in-vehicle network 170. The in-vehicle network 170 may include, but is not limited to, one or more of a controller area network (CAN), an Ethernet network, and a media oriented system transport (MOST), as some examples.

The computing platform 104 may be a telematics control unit (TCU) 180 connected to a telematics control unit (TCU) 180 via the in-vehicle network 170 configured to provide telecommunication capabilities. The TCU 180 may be provided with a wireless modem 182 configured to communicate with a remote server 192 via a wireless network 190 through a wireless connection 174. As an example, the wireless network may be a cellular network. The computing platform 104 may be further configured to communicate with various sensors 188 via the in-vehicle network 170 configured to detect various signals exterior to the vehicle 102. As a few non-limiting examples, the sensors 188 may include a camera 184 configured to detect exterior video images and a LIDAR sensor 186 configured to detect objects the vicinity of the vehicle 102.

The computing platform 104 may be configured to communicate with a mobile device 140 of the vehicle occupants/users via a wireless connection 172. Alternatively, the mobile device 140 may be connected to the computing platform 104 via a wired connection (not shown). The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 132 in communication with a Wi-Fi controller 134, a Bluetooth controller 136, and other controllers such as a Zigbee transceiver, an IrDA transceiver, an RFID transceiver (not shown), configured to communicate with a compatible wireless transceiver 162 of the mobile device 140.

The mobile device 140 may be provided with a processor 148 configured to perform instructions, commands, and other routines in support of the processes such as navigation, calling, wireless communication, and multi-media processing. For instance, the processor 148 may be configured to execute instructions of mobile applications 144 to provide the above features and functions.

The mobile device 140 may be provided with a wireless transceiver 162 in communication with a Wi-Fi controller 158, a Bluetooth controller 160, and other communication controllers (not shown), configured to communicate with the wireless transceiver 132 of the computing platform 104 via a wireless connection 172. Alternatively, the mobile device 140 may be connected to the computing platform 104 via a wired connection (not shown).

The mobile device 140 may be provided with various features allowing the users to interface with the mobile device 140. For example, the mobile device 140 may receive input from HMI controls 156 configured to provide for user interaction with the mobile device 140. For instance, the mobile device 140 may be configured to interface with a touch screen 152 via a video controller 150 to provide interactions with the user. The mobile device 140 may be further configured to interface with a camera 166 via the video controller 150 to provide video input to the mobile device 140.

The mobile device 140 may also be provided with navigation and route planning functions through a navigation controller 164 configured to plan navigation routes responsive to user input via e.g. the touch screen 152 by way of the HMI controls 156, and output planned routes and instructions via the display touch screen 152. Location data needed for navigation may be collected from a GPS controller 154 configured to communicate with multiple GPS satellites and calculate the location of the mobile device 140. Navigation software may be stored in the storage 142 as a part of the mobile applications 144. Map data used for route planning may be stored in the storage 142 as a part of the mobile data 146.

The mobile device 140 may be further provided with telecommunication capabilities to a wireless network 190 via a wireless connection 176 by way of a modem (not shown). Mobile device 140 and the computing platform 104 may be configured to communicate with the wireless network 190 collectively and/or individually and share data through the wireless connection 172. It is note that both the server 192 and the wireless network 190 are used as general terms and may include multiple servers and network infrastructures in the present disclosure.

Figure 2:
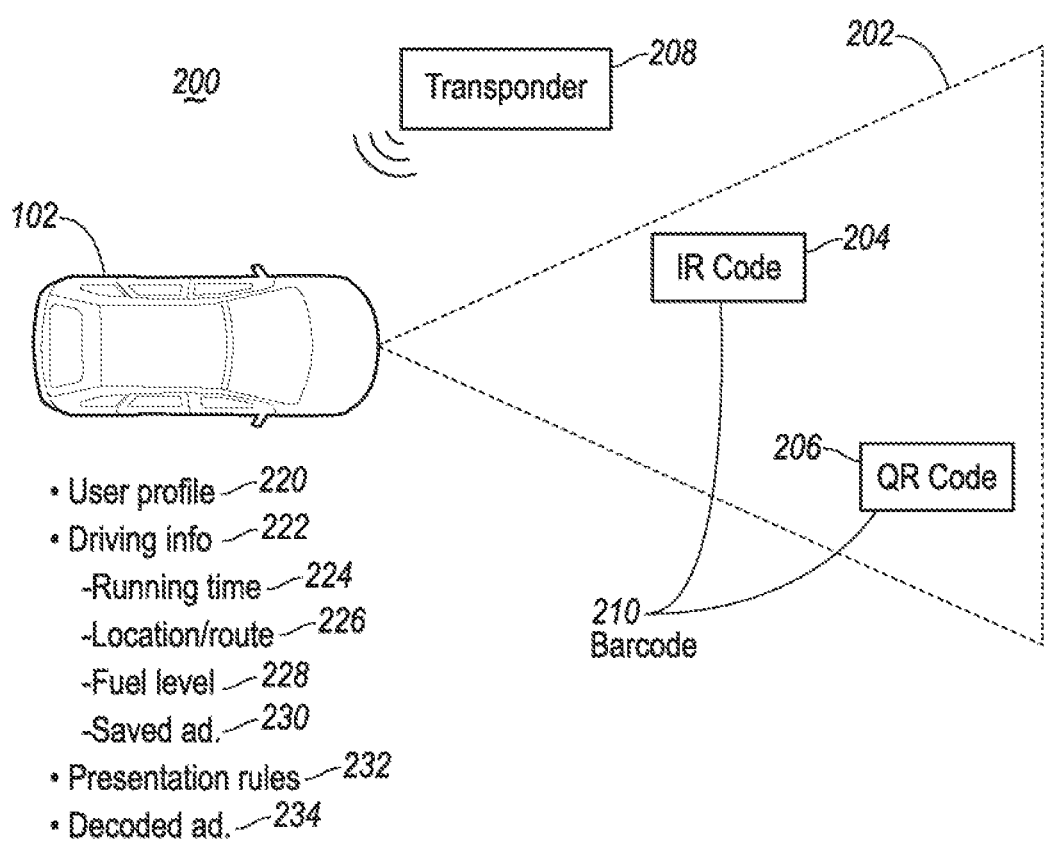
FIG. 2 illustrates an example diagram of the vehicle system of one embodiment of the present disclosure.

Referring to FIG. 2, a vehicle system diagram 200 of one embodiment of the present disclosure is illustrated. With continuing reference to FIG. 1, the vehicle 102 may be configured to detect advertisement located at a predefined vicinity of the vehicle 102. The computing platform 104 may be configured to activate the exterior camera 184 to capture barcode images 210 such as an infrared (IR) code 204 or a quick response (QR) code 206 within a predefined capture range 202 of the exterior camera 184. Additionally or alternatively, the computing platform 104 may be configured to use other cameras such as the camera 166 of the mobile device 140 in communication with the computing platform 104 to capture the barcode image 210. The barcode 210 such as the QR code 206 may contain a variety of information. For instance, the barcode 210 may contain text advertisement content for a business. Additionally, the barcode 210 may further contain information indicating type of advertising business (e.g. restaurant, hotel or etc.), location (e.g. zip code, address, or etc.), web links, phone numbers, and/or priority of presentation. Alternatively, the barcode 210 may further be used as an emergency warning, such as a local flood warning near the place where the barcode 210 is displayed, with the highest priority instructing the computing platform 104 to present to the vehicle user immediately. The billboard or sign displaying the barcode 210 may be a digital display remotely controlled by advertising authorities.

It is noted that the term barcode in the present disclosure is used as a general term and may include any linear, 2D or future code image to represent numeric character, alphanumeric character, or character of any language to convey information. As a few non-limiting examples, the barcode may include Code 128, Code 39, ITF-13, Aztec, Data Matrix, PDF417, QR code and etc. Additionally, the exterior camera 184 of the vehicle 102 may be further configured to support symbols and/or codes displayed in wavelengths beyond a visible spectrum to the human eye (e.g. IR code or ultraviolet (UV) code). Additionally, the computing platform 104 may be configured to receive advertisement information from a transponder 208 emitting wireless signals. The transponder 208 may transmit various types of signals supported by the computing platform. For instance, the computing platform 104 may receive WiFi, Bluetooth, near-field communication (NFC), LIDAR, and/or dedicated short range communications (DSRC) signals from the transponder 208 via various sensors 188 to receive the advertisement information.

Responsive to receiving the barcode 210 via the exterior camera 184 or a sensor, the computing platform 104 may be configured to decode the barcode 210 using the processor 112 to extract the decoded advertisement content 234 to present to the user. The computing platform 104 may be configured to selectively present the decoded advertisement content 234 to the vehicle user based on various factors according predefined presentation rules 232. For instance, the computing platform 104 may use a user profile 220 to determine whether and how to present the decoded advertisement 234 to the vehicle user. The user profile 220 may include various information associated with the user, such as common locations, driving patterns, age, gender, history of ad interactions and etc. The user profile 220 may be created by the computing platform 104 or received from elsewhere such as the mobile device 140 associated with the vehicle user to reflect preferences of a particular user. For instance, the user profile 220 may indicate a particular vehicle user is extremely interested in hotels, somehow interested in shopping malls, but not interested in fast food restaurants. Using the user profile 220 reflecting the user's preferences and interests, the computing platform 104 may decide to present or block the decoded advertisement 234. Using the above example, the computing platform 104 may decide to block any advertisement for fast food restaurants and proceed to present advertisements for hotels and shopping malls.

Since the user is more interested in hotels, the computing platform 104 may be configured to display hotel advertisements in a more visually appealing way. For instance, the computing platform 104 may display hotel advertisements using the HUD 118 on the windshield to attract the attention of the user. In case that the advertisement is a barcode 210 detected by the exterior camera 186, the computing platform 104 may be further configured to overlay the decoded advertisement 234 over the target barcode 210 on the windshield with the help of the interior camera 138 configured to track the sitting position and eye positions/motions of the user. For shopping mall advertisements, the computing platform 104 may be configured to display the advertisement via the display 116 and/or the speaker 122 without using the HUD 118 to reduce distraction. Additionally or alternatively, the computing platform may be further configured to send the decoded advertisement 234 to the mobile device 140 via the wireless connection 172 for presentation and future reference purposes. In cases that the advertisement contains an Uniform Resource Locator (URL) or any type of link or web address, the computing platform 104 may be configured to automatically connect to the URL or the address to download the advertisement content such as an image or a logo for presenting to the user. The computing platform 104 may be further configured to dial a phone number contained in the advertisement to provide audio output to the vehicle user.

The computing platform 104 may be further configured to use driving information 222 to determine the presentation of the decoded advertisement 234. For instance, the driving information 222 may include information about the operation of the vehicle 102, such as vehicle running time 224, location and route 226, fuel level 228, saved advertisement 230 and etc. The driving information 222 may be used by the computing platform 104 to further target specific vehicle users to improve the advertising effectiveness. For instance, if the vehicle 102 has been on the road for 12 hours according to the running time 224 and travelled for hundreds of miles on a highway according to the location and route information 226, then the advertisements for hotels may become more relevant and more likely to be appealing to the vehicle user. In this case, the computing platform 104 may selectively present more advertisements for hotel rooms responsive to detecting them along the road. To further improve the effectiveness of the advertisement, the computing platform 104 may be further configured to be allowed to access emails or calendars associated with the user profile 220 to check whether the user has already booked a hotel room.

In another example, when the vehicle 102 is running low on fuel, advertisements for businesses associated with fueling stations may become more relevant, and the computing platform 104 may be configured to adjust the presentation for those businesses accordingly. The computing platform 104 may be further configured to output a notice or warning message along with the presentation of the advertisement to remind the user to refuel soon to further improve the effectiveness of the advertisement.

In another example, the computing platform 104 may be configured to temporarily save an advertisement 230 that is detected and present it at a later time when the saved advertisement 230 becomes more relevant. For instance, the computing platform 104 may detect a barcode 220 advertising a restaurant that is 50 miles down the road from the billboard or sign displaying the barcode 210. The location of the restaurant may be obtained via a URL link or an address/zip code embedded in the barcode 210, and the distance from the vehicle 102 may be calculated by the computing platform 104 using the location and route information 226. In this case, instead of presenting the advertisement to the user right away, a more effective way to advertise may be to delay the presentation until the vehicle 102 gets closer to the restaurant meeting a predefined distance or time condition (e.g. within 5 miles or 5 mins from the restaurant). The computing platform 104 may be configured to store the advertisement as a saved advertisement 230 in the storage 106 as a part of the vehicle data and load the saved advertisement 230 when the distance or time condition is met.

Figure 3:
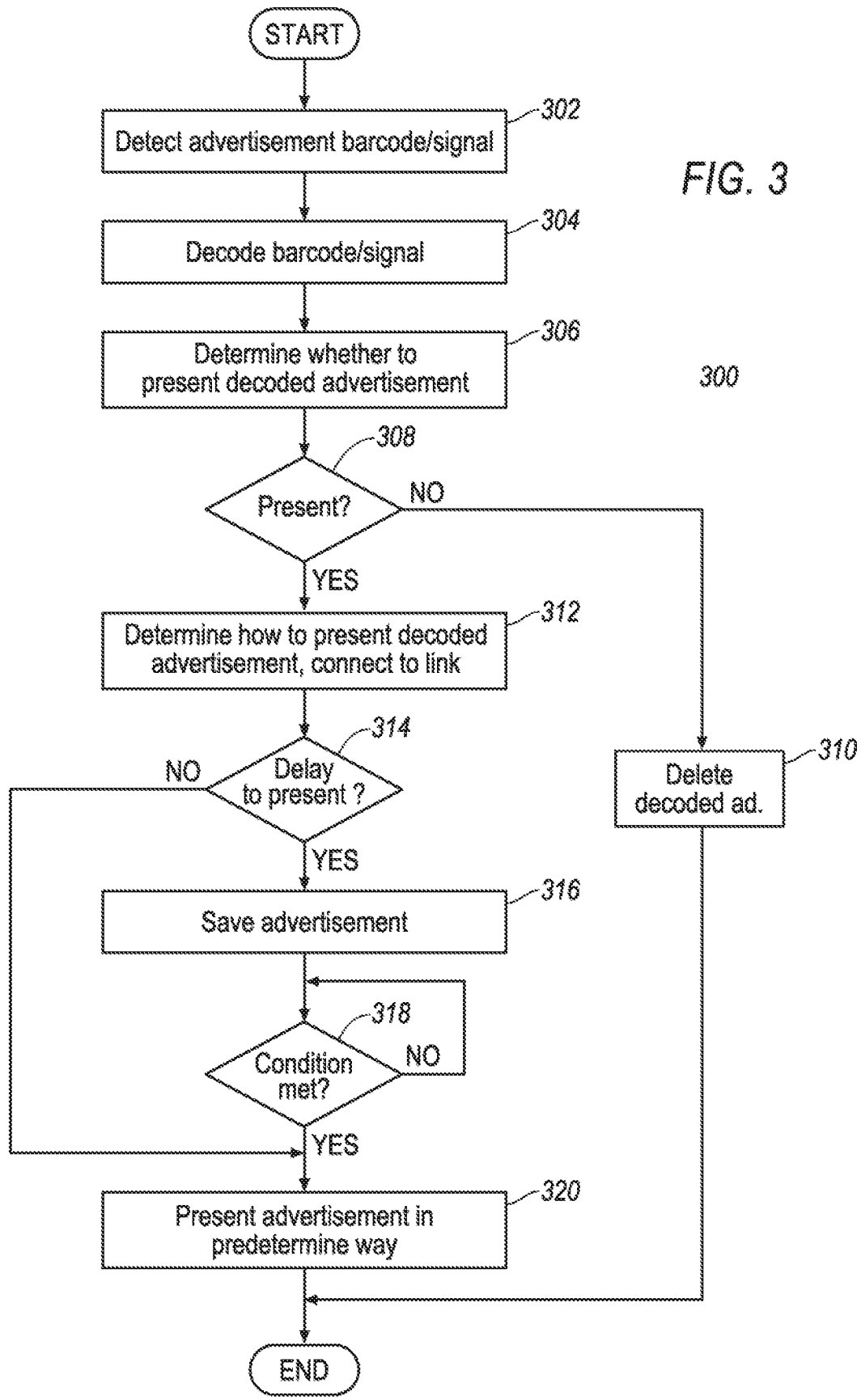
FIG. 3 illustrates a flow diagram of a process for advertising of one embodiment of the present disclosure.

Referring to FIG. 3, a flow diagram of a process 300 for advertising to a vehicle user of one embodiment of the present disclosure is illustrated. With continuing reference to FIGS. 1 and 2, at operation 302, the computing platform 104 detects an advertisement barcode 210 presented within the range 202 of the exterior camera 184. For instance, the barcode 210 may be displaced on a billboard or a sign along a highway that the vehicle 102 travels on. Alternatively, the computing platform 104 may be configured to detect a wireless signal transmitted from a transponder 208 via sensors 188 to receive the advertisement.

At operation 304, the computing platform 104 decodes the detected barcode 210 or signal to obtain a decoded advertisement 234. Next, at operation 306, the computing platform 104 determines whether to present the decoded advertisement to the vehicle user. As discussed above, the computing platform 104 may use various factors including the information and instructions contained in the advertisement, the user profile 220, the driving information 222 and presentation rules 232 to determine whether the decoded advertisement 234 should be presented. If the computing platform 104 determines the decoded advertisement should not be presented at operation 308, the process proceeds to operation 310 to delete the decoded advertisement 234 from the computing platform 104. Otherwise, the process proceeds to operation 312 and the computing platform 104 further determines how the decoded advertisement 234 is to be presented to the user using various factors including the information and instructions contained in the advertisement, the user profile 220, driving information 222, and the presentation rules 232. In case that the advertisement 234 contains a web link, the computing platform 104 further connect to the remote server 192 using the link to download the multimedia advertising content which may include audio, video, and/or image files for presentation purposes.

At operation 314, if the computing platform 104 determines the decoded advertisement should be presented to the vehicle user immediately, the process proceeds to operation 320 and the computing platform 104 presents the decoded advertisement to the vehicle user in the way that is determined at operation 312. For instance, the computing platform 104 may project image or video downloaded from the server 192 for the advertisement 234 onto the front windshield via the HUD 118 while playing the downloaded advertising audio content. Additionally or alternatively, the computing platform 104 may present the advertisement 234 to the user via the display 116, the speaker 122 and/or the mobile device 140.

If the computing platform 104 determines the decoded advertisement 234 should not be immediately presented, the process proceeds to operation 316 to store the decoded advertisement 234 as a saved advertisement 230 in the storage 106 as a part of the vehicle data 110. In addition, the computing platform 104 may further set a presentation condition for the saved advertisement 230 using factors such as the presentation rules 232, user profile 220, and driving information 222. At operation 318, the computing platform 104 determines whether the predefined presentation condition for the save advertisement 230 is met. Responsive to meeting the presentation condition (e.g. within a distance or a time frame from the advertising business location), the process proceeds to operation 320 and the computing platform 104 presents the advertisement 230 to the vehicle user in the predetermined manner.

Figure 4:
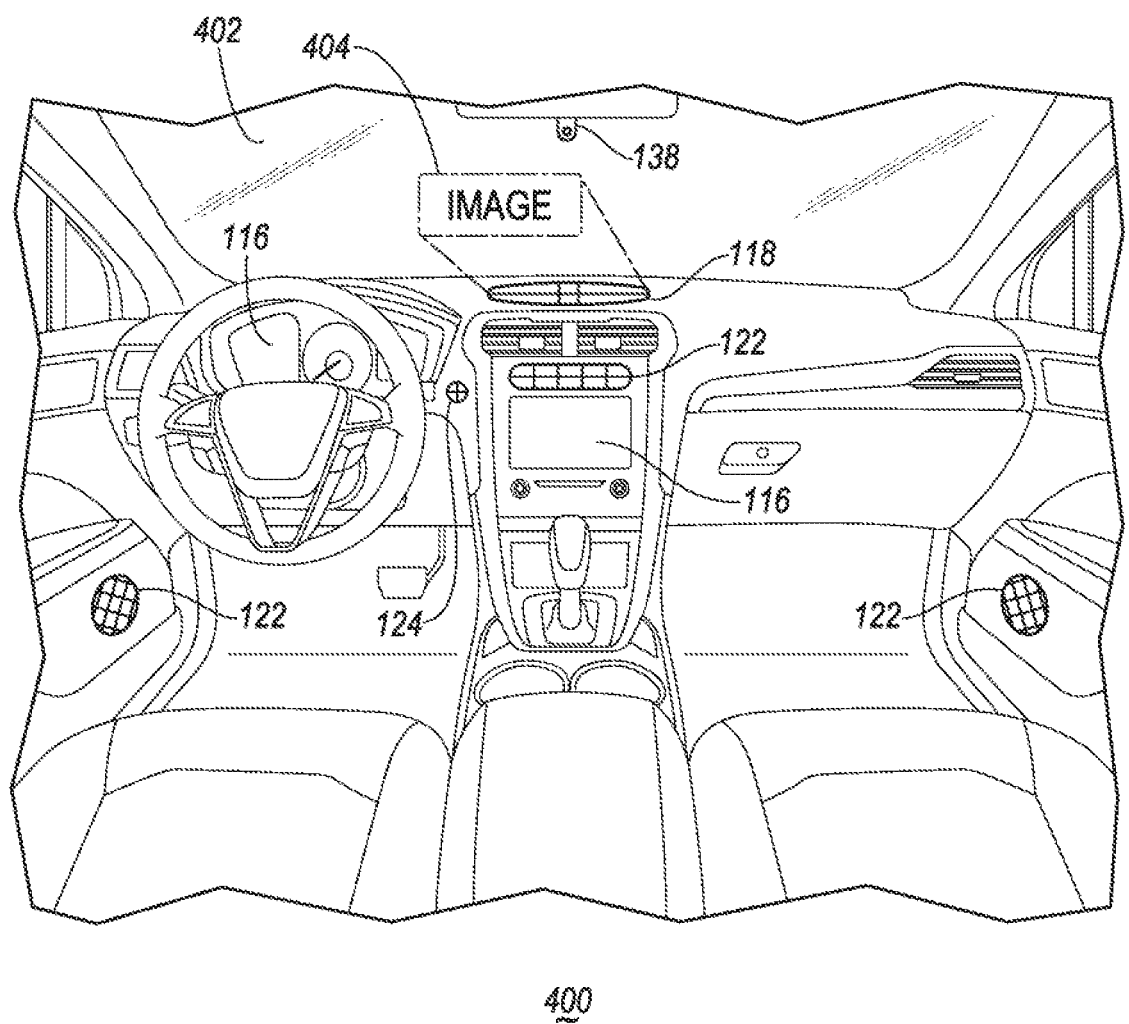
FIG. 4 illustrates a cabin diagram for the vehicle of one embodiment of the present disclosure.

Referring to FIG. 4, an example cabin diagram 400 of the vehicle 102 of one embodiment of the present disclosure is illustrated. With continuing reference to previous Figures, the vehicle 102 may be provided with a windshield 402 used as a surface for the HUD 118 to project an image 404 on. The image 404 may include text, video, logo, or any visual components of a decoded advertisement 234. The location of the image to be projected may vary within a predefined area, and depending on the configuration of the HUD 118, the predefined area may include the entire surface area of the windshield 402. To determine the location on the windshield 404 by the HUD for better user experience, the interior camera 138 may be used to track the sitting position and eye motion of the vehicle user and send such information to the computing platform 104. Responsive to receiving the sitting position and eye motion information of the vehicle user, the computing platform 104 may calculate the best location to project the image 404 on the windshield. For instance, the computing platform 104 may be configured to project the image 404 at a location overlaying the barcode from the user's perspective via the HUD 118. Alternatively, the computing platform 104 may put the image 404 at a location that does not distract the user.

Additionally or alternatively, the computing platform 104 may present the decoded advertisement 234 via the display 116 by way of the video controller, and/or via the speaker 122 by way of the audio controller 120.

Figure 5A:
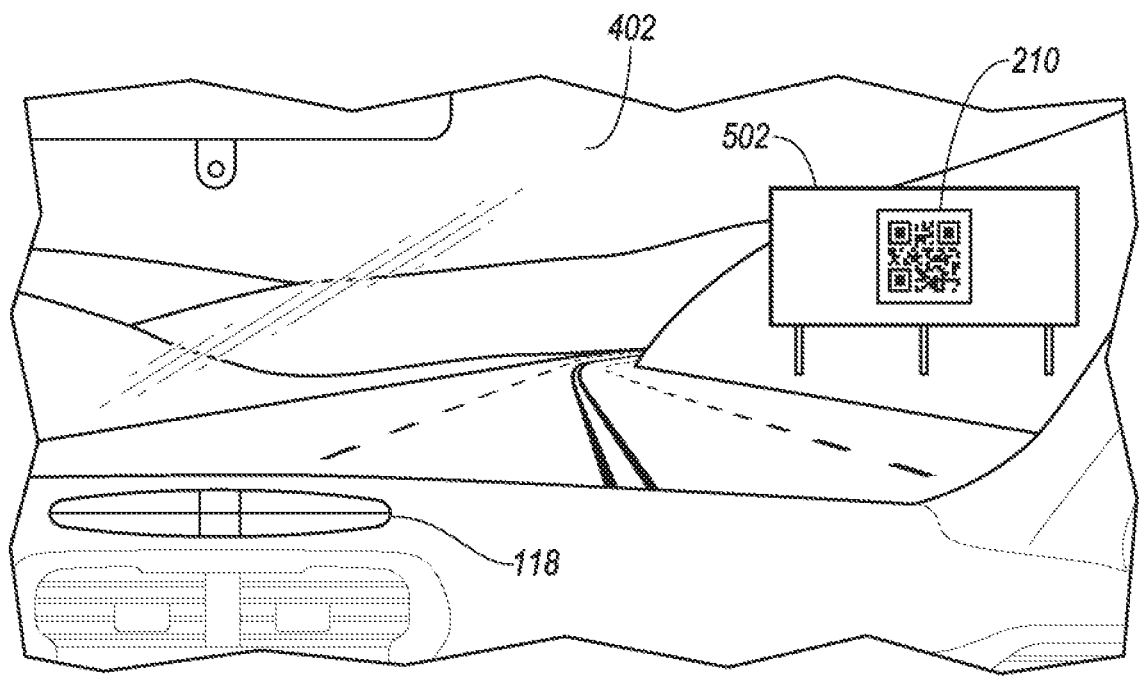
FIGS. 5A and 5B illustrate example diagrams for HUD projection on a windshield of one embodiment of the present disclosure.
Figure 5B:
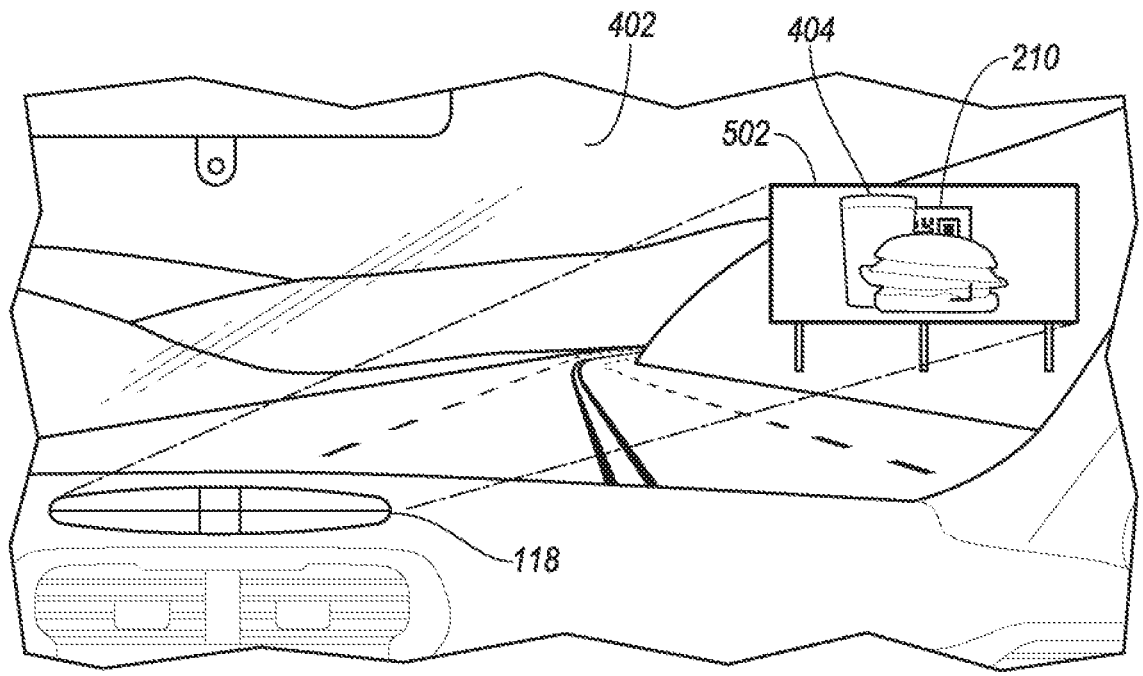

Referring to FIGS. 5A and 5B, example diagrams for HUD projection on a windshield of one embodiment of the present disclosure is illustrated. As illustrated in FIG. 5A, while driving on a road, the vehicle 102 approaches a billboard 502 displaying a barcode 210 located on the right-hand side of the road. The exterior camera 184 may capture the image of the barcode 210 for the computing platform to decode. The barcode 210 may contain a weblink such as an URL, and responsive to obtaining the weblink, the computing platform 104 may automatically connect to the remote server 190 using the weblink via the TCU 182 to download the advertisement content such as a picture logo image 404. Responsive to a successful download, the computing platform 104 may project the advertising image 404 on the windshield 402 via the HUD 118 at a location substantially overlaying the barcode 210 around the billboard from the vehicle user's perspective using information captured by the interior camera 138 as discussed above. The computing platform 104 may be further configured to determine the size of the billboard also captured by the exterior camera 184 to match the size of the advertisement image 404 substantially to the billboard.

Figure 6:
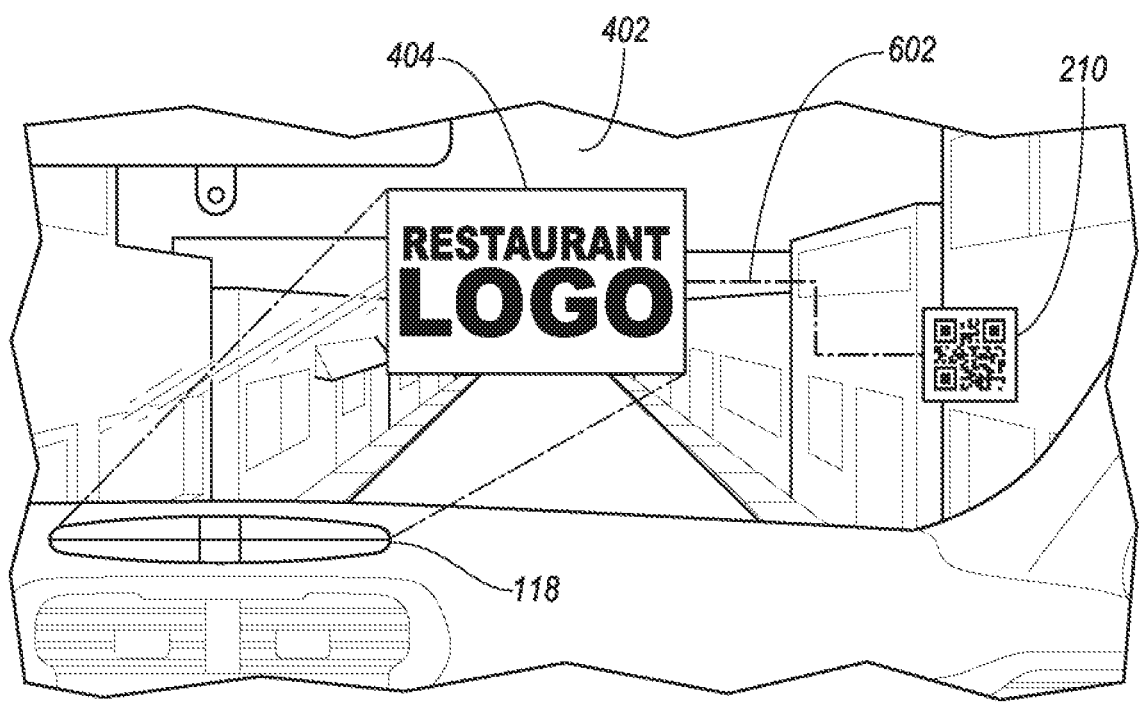
FIG. 6 illustrates another example diagram for HUD projection on a windshield of one embodiment of the present disclosure.

Referring to FIG. 6, an example diagram for HUD projection on a windshield of another embodiment of the present disclosure is illustrated. Different from the example illustrated with reference to FIG. 5B, in the present example, the barcode 210 is displayed on sidewall or a sign near a city street where billboards may not be applicable due to space constraints. The computing platform 104 may be configured to project the advertisement image 404 onto the windshield 402 at a location not distractive to the vehicle user. For instance, the image 404 may be projected near the top of the windshield 402 and associate the image 404 with the barcode 210 via a line 602.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a controller programmed to,
   responsive to detecting a barcode displayed outside the vehicle via an exterior sensor, decode the barcode, and project an image representing an information decoded from the barcode on a windshield of the vehicle, the image overlaying the barcode from a perspective of a user.

2. The vehicle of claim 1, wherein the controller is further programmed to track an eye position of the user via an interior camera to determine a position on the windshield to project the image.

3. The vehicle of claim 1, wherein the controller is further programmed to dynamically adjust a size of the image projected onto the windshield to substantially obscure the barcode.

4. The vehicle of claim 1, wherein the controller is further programmed to download the image from a weblink contained in the information decoded from the barcode.

5. The vehicle of claim 1, wherein the controller is further programmed to determine whether to present the information decoded from the barcode using a profile of the user including information indicative of at least one of: locations commonly visited, driving patterns, age, gender, or history of advertisement interactions.

6. The vehicle of claim 5, wherein the controller is further programmed to determine whether to present the information decoded from the barcode using vehicle driving information including at least one of: vehicle running time, location, route, or fuel level.

7. The vehicle of claim 1, wherein the controller is further programmed to dial a phone number contained in the information decoded from the barcode.

8. The vehicle of claim 1, wherein the exterior sensor includes at least one of: an exterior camera, a LIDAR sensor, or a wireless transceiver, and the wireless transceiver is configured to support at least one of: WiFi, Bluetooth, near-field communication (NFC), or dedicated short range communications (DSRC).

9. The vehicle of claim 1, wherein the controller is further programmed to save an advertisement decoded from the barcode, and responsive to a predefined condition being met, present the saved advertisement, wherein the predefined condition includes at least one of: distance between the vehicle and an advertising business location, or time to travel to the advertising business location.

10. A vehicle, comprising:
    a controller programmed to,
    responsive to detecting a wireless signal transmitted from a transponder via an exterior sensor, process the wireless signal to obtain a message containing a weblink, download an image via the weblink, and project the image on a surface of the vehicle.

11. The vehicle of claim 10, wherein the controller is further programmed to download audio data via the weblink, and play the audio data via a speaker.

12. The vehicle of claim 10, wherein the controller is further programmed to dial a telephone number contained in the message and play an audio received via the telephone number via a speaker.

13. The vehicle of claim 10, wherein the wireless signal may be at least one of the following types: WiFi, Bluetooth, near-field communication (NFC), LIDAR, or dedicated short range communications (DSRC).

14. The vehicle of claim 10, wherein the controller is further programmed to save the message, and responsive to a predefined condition being met, present the saved message, wherein the predefined condition includes at least one of: distance between the vehicle and a business location determined via the message, or time to travel to the business location.

15. A method for a vehicle, comprising:
    responsive to detecting, by a camera, a barcode displayed outside the vehicle, decoding the barcode to obtain an advertising information by a processor;
    downloading a digital file using a weblink contained in the advertising information from a server by the processor; and
    outputting an advertising message to a vehicle user using the digital file by an output.

16. The method of claim 15, further comprising:
    projecting an image included in the digital file on a windshield of the vehicle by a projector.

17. The method of claim 16, wherein the image overlays the barcode from a perspective of the user.

18. The method of claim 17, further comprising:
    tracking an eye position of the user via an interior sensor to determine a position on the windshield to project the image.

19. The method of claim 17, further comprising:
    dynamically adjusting a size of the image projected onto the windshield to substantially obscure the barcode.

* * * * *